United States Patent
Ichikawa et al.

(10) Patent No.: US 7,097,168 B2
(45) Date of Patent: Aug. 29, 2006

(54) PNEUMATICALLY OPERATED FLUID FILLED ENGINE MOUNT

(75) Inventors: Hiroyuki Ichikawa, Kani (JP); Syouji Akasa, Ichinomiya (JP); Masaaki Hamada, Konan (JP); Yuichi Ogawa, Kasugai (JP)

(73) Assignee: Tokai Rubber Industries, Ltd., Komaki (JP)

( * ) Notice: Subject to any disclaimer, the term of this patent is extended or adjusted under 35 U.S.C. 154(b) by 0 days.

(21) Appl. No.: 10/811,425

(22) Filed: Mar. 26, 2004

(65) Prior Publication Data

US 2004/0188899 A1  Sep. 30, 2004

(30) Foreign Application Priority Data

Mar. 31, 2003 (JP) ............................. 2003-094220

(51) Int. Cl.
*F16F 13/00* (2006.01)

(52) U.S. Cl. ............................ 267/140.13; 267/140.11; 267/219

(58) Field of Classification Search ........... 267/140.11, 267/140.13, 140.14, 140.15, 219; 248/560, 248/562, 636
See application file for complete search history.

(56) References Cited

U.S. PATENT DOCUMENTS

| | | | |
|---|---|---|---|
| 5,170,998 A | 12/1992 | Muramatsu | |
| 5,217,211 A * | 6/1993 | Ide et al. ............... | 267/140.13 |
| 5,246,212 A * | 9/1993 | Funahashi et al. ..... | 267/140.13 |
| 6,264,181 B1 * | 7/2001 | Muramatsu et al. ... | 267/140.14 |
| 6,523,813 B1 * | 2/2003 | Kato ...................... | 267/140.11 |
| 6,755,401 B1 * | 6/2004 | Akasa et al. ........... | 267/140.11 |
| 6,808,168 B1 * | 10/2004 | Muramatsu et al. ... | 267/140.13 |

FOREIGN PATENT DOCUMENTS

| | | |
|---|---|---|
| DE | 197 25 771 C1 | 11/1998 |
| DE | 101 59 355 A1 | 6/2002 |
| JP | A57-9340 | 1/1982 |
| JP | 6-89803 | 11/1994 |
| JP | 57-9349 | 1/2002 |
| JP | 2002295571 A | 10/2002 |

OTHER PUBLICATIONS

Office Action dated Oct. 17, 2005 for German Patent Application No. 10 2004 015 284.5-12, 3 pages with translation.

\* cited by examiner

*Primary Examiner*—James McClellan
*Assistant Examiner*—Mariano Sy
(74) *Attorney, Agent, or Firm*—Beyer Weaver & Thomas LLP

(57) ABSTRACT

A fluid filled engine mount including: a pressure-receiving chamber and an equilibrium chamber connected via an orifice passage tuned to a frequency band of engine idling vibrations; an orifice control member operable by means of negative pressure exerted from an external space so as to restrict flow of the fluid through the orifice passage when an absolute value of the exerted negative pressure is greater than a predetermined value; and a negative pressure conduit of direct connection type, adapted to always introduce negative pressure available from an air intake port of an internal combustion engine to the orifice control member.

8 Claims, 6 Drawing Sheets

PNEUMATICALLY OPERATED FLUID FILLED ENGINE MOUNT

The disclosure of Japanese Patent Application No. 2003-094220 filed on Mar. 31, 2003 including the specification, drawings and abstract is incorporated herein by reference in its entirety.

BACKGROUND OF THE INVENTION

1. Field of the Invention

The present invention relates generally to a fluid-filled engine mount capable of exhibiting vibration damping effect or action based on resonance or flow action of non-compressible fluid sealed therein. More specifically, the present invention is concerned with such a fluid-filled engine mount of novel structure that is capable of providing excellent vibration damping or isolating effect against input vibration over a wide frequency band by automatically controlling its damping characteristics in accordance with fluctuation of vibrations to be damped, without needing complicated control means such as switch valves and control devices.

2. Description of the Related Art

Vibrations (including noises induced by the vibrations) in a body or various components of an automotive vehicle often become a major problem, and, in order to isolate such vibrations, an engine mount for suppressing the vibration transmission from a power unit, which is one of the sources of vibration, to the body has been conventionally employed.

As one type of such vibration damping devices, known is a fluid-filled engine mount having a non-compressible fluid sealed within a fluid chamber thereof and which provides passive vibration damping effect by utilizing resonance of the non-compressible fluid that is forced to flow therein upon the input of vibration. A known example of such a fluid-filled engine mount is disclosed in Citation 1 listed below. However, this type of engine mount suffers from a problem that the damping effect is effective only to the narrow frequency range to which the orifice passage is tuned.

Typically, automotive vehicles are subjected to vibrations whose frequencies are changed depending upon driving condition thereof. When driving, a vehicle tends to suffer from driving booming noises or other high frequency and small-amplitude vibrations, or engine shapes or other low frequency and large-amplitude vibrations. When idling, the vehicle tends to suffer from idling vibrations or other medium frequency and medium amplitude vibrations. That is, vibrations excited in automotive vehicles will be over a wide frequency range.

In order to provide different damping performances depending on driving conditions, the present assignee has disclosed in the following Citation 2, a switch-control type fluid-filled engine mount whose damping characteristics can be switched among different values under control. Namely, the disclosed engine mount incorporates two different orifice passages that are alternately affected by changing air pressure applied thereto, whereby the engine mount can exhibit different damping effects with respect to different frequency ranges to which the two orifice passage is tuned on the basis of resonance of the fluid flowing through the respective orifice passages.

However, the switch control type fluid-filled engine mount must be assembled, in order to control applied air pressure, with switch valves, drive means for driving the switch valves, control means for controlling the drive means, and various of sensors for sensing signals required in the control means. Therefore, the number of components will increase, and the construction of the device will become extremely complex, making the assembly procedure become troublesome, and increasing the manufacturing costs.

[Citation 1] JP-A-57-009340
[Citation 2] JP-A-06-089803

SUMMARY OF THE INVENTION

It is therefore an object of the invention to provide a fluid-filled engine mount having a simple and novel structure, and which is capable of changing its damping characteristics in accordance with changes in input vibrations required to be damped, without needing complex components such as specific switch valves, driving means, control mechanism, or the like.

The above and/or optional objects of this invention may be attained according to at least one of the following modes of the invention. Each of these modes of the invention is numbered like the appended claims and depending from the other mode or modes, where appropriate, to indicate possible combinations of elements or technical features of the invention. It is to be understood that the principle of the invention is not limited to these modes of the invention and combinations of the technical features, but may otherwise be recognized based on the teachings of the present invention disclosed in the entire specification and drawings or that may be recognized by those skilled in the art in the light of the present disclosure in its entirety.

Extensive studies has been conducted by the present inventors in order to achieve the aforesaid object of the invention, and the obtained result revealed the facts that: a negative pressure value available from an air intake side of an internal combustion engine of an automotive vehicle will vary depending on running conditions of the vehicle; and it will be considerably changed between the running condition and idling condition of the vehicle. In view of the above results, the present inventor reached a finding that a fluid-filled engine mount capable of exhibiting desirable damping effects over a wide frequency range can be realized with simple structure, by changing its damping characteristics by directly utilizing the negative pressure available from the air-intake side of the internal combustion engine.

A first mode of the invention is a fluid filled engine mount for an automotive vehicle, comprising: (a) a first mounting member; (b) a second mounting member disposed spaced away from the first mounting member; (c) an elastic body for elastically connecting the first mounting member and the second mounting member; (d) a pressure-receiving chamber filled with non-compressible fluid and partially defined by the elastic body so as to excite fluid pressure fluctuation upon input of vibration; (e) an equilibrium chamber filled with the non-compressible fluid and partially defined by a flexible layer so as to permit change in volume; (f) an orifice passage for connecting the equilibrium chamber to the pressure-receiving chamber, and tuned to a frequency band of engine idling vibrations; (g) an orifice control member operable by means of negative pressure exerted from an external space so as to restrict flow of the fluid through the orifice passage when an absolute value of the exerted negative pressure is greater than a predetermined value; and (h) a negative pressure conduit of direct connection type, adapted to always introduce negative pressure available from an air intake port of an internal combustion engine to the orifice control member.

With the fluid-filled engine mount constructed according to this mode, a function of the orifice passage will be controlled by always utilizing negative pressure generated in the air-intake port of the engine. This makes it possible to change damping characteristics of the engine mount without needing complex and expensive components such as switch valves and valve driving means. Namely, the fluid-filled engine mount of this mode is able to change its damping characteristics depending on engine operating condition (i.e., vehicle driving condition). Thus, the present embodiment provides a fluid-filled engine mount capable of exhibiting excellent damping action with respect to input vibration of a plurality or a wide range of frequency bands while having a simple and compact structure that is cheap to manufacture.

A second mode of the invention is a fluid-filled engine mount according to the above-described first mode, further comprising: a rubber elastic plate partially defining the pressure-receiving chamber; and a working air chamber formed on an opposite side across from the rubber elastic plate in relation to the pressure-receiving chamber, and adapted to function as the orifice control member, wherein the negative pressure conduit is connected to the working air chamber so that the rubber elastic plate is suctioned to be held in contact with an interior face of the working air chamber to restrict a motion thereof when the absolute value of the negative pressure exerted to the working air chamber is greater than the predetermined value, and is moved away from the interior face of the working air chamber so as to be elastically deformable due to an elastic resiliency thereof, when the absolute value of the negative pressure is not greater than the predetermined value.

According to this mode of the invention, the vibration damping performance of the engine mount is automatically changed depending on input vibrations varying in accordance with vehicle driving conditions, since there is effectively utilized negative pressure generated in the air intake side of the engine, whose value fluctuates in accordance with the driving condition of the vehicle. More specifically, the absolute value of the negative pressure generated in the air intake side of the engine is made large when the vehicle is in its engine idling condition, and is made small when the vehicle is in its driving condition. With the negative pressure of a relatively large absolute value (hereinafter referred simply to the "value", where appropriate) exerted on the working air chamber, during the engine idling condition, the rubber elastic plate is suctioned to be held in contact with the interior face of the working air chamber thereby restricting motion of the rubber elastic plate. With this state, avoided is fluid pressure absorption in the pressure-receiving chamber by means of the rubber elastic plate, thereby effectively ensuring a sufficient amount of flow of the fluid through the orifice passage between the pressure-receiving chamber and the equilibrium chamber. Thus, the fluid-filled engine mount of this mode is able to exhibit excellent vibration damping effect on the basis of resonance of the fluid flowing through the orifice passage upon input of the idling vibrations.

On the other hand, when the vehicle is in non-idling, i.e., running condition, engine vibrations become a significant problem especially in an acceleration condition where a throttle valve opening degree increases and generated negative pressure value decreases. As a result, the rubber elastic plate is moved away from the interior face of the working air chamber, to become freely elastically deformable. Therefore, pressure fluctuation generated in the pressure-receiving chamber during input of vibrations will be absorbed by means of the elastic deformation of the rubber elastic body. Thus, the fluid-filled engine mount of this mode is able to exhibit excellent vibration damping or isolating effect with respect to booming noises during running of the vehicle, for example.

With this arrangement, since the wall spring stiffness of the pressure-receiving chamber is made small by the presence of the rubber elastic plate, the tuning frequency of the orifice passage is shifted to the lower frequency side. This means that by suitably adjusting the material, shape, size etc. of the rubber elastic plate, and magnitude of air pressure fluctuation exerted to the working air chamber, an amount of change in the tuning frequency of the orifice passage in accordance with the air pressure fluctuation exerted on the working air chamber is suitably adjusted. With this arrangement, when the negative pressure applied to the working air chamber is made small during running of the vehicle, the tuning frequency of the orifice passage is accordingly shifted to the low frequency range corresponding to engine shapes of the like. Thus, the fluid-filled engine mount of this mode is able to exhibit excellent vibration damping effect with respect to low frequency vibration such as engine shakes, on the basis of resonance of the fluid flowing through the orifice passage, as well.

A third mode of the invention is a fluid-filled engine mount according to the above-described second mode, wherein the interior face of the working air chamber is defined by a recess having a mortar shape with somewhat inward curve, and an opening of the recess is fluid-tightly close by the rubber elastic plate so as to provide the working air chamber, and the negative pressure conduit is open to an approximately central portion of a bottom face of the recess, while the rubber elastic plate has a generally dome shape having a smooth inner surface somewhat projecting into a pressure-receiving chamber side entirety, and having an outer surface with a central thick walled portion projecting outward in a central portion thereof.

According to this mode, the working air chamber is formed with the interior face of mortar shape, allowing the rubber elastic plate to be held in close contact with the interior face over a wide area as much as possible, so that the rubber elastic plate is stably held in its restricted state with efficiency and stability. On the outer surface of the rubber elastic plate, a shoulder portion is formed at a junction between a basal-side outer peripheral edge of the central thick walled portion and the outer surface of the rubber elastic plate. This shoulder portion is positioned situated above the intermediate portion of the sloped mortar shape interior face of the working air chamber, as seen in vertical direction. With this arrangement, after the suctioned portion of the rubber elastic plate is suctioned to be held in contact with the interior face of the working air chamber, by means of a relatively large negative pressure applied thereto during idling condition of the vehicle, once the vehicle is shifted to its running and acceleration conditions and the negative pressure applied to the working air chamber is minimized, the central thick walled portion of the rubber elastic plate is restored to its original state or shape owing to a relatively large elasticity of the thick walled portion. That is, the presence of the thick walled portion assures that the rubber elastic plate will be stably restored from a suctioned state being adhered to the interior face of the working air chamber to an original state being spaced away from the interior face, owing to the large elasticity of the thick walled portion. Thus, the fluid-filled engine mount of this mode permits a stable operation of changing its damping characteristics with improved stability.

A fourth mode of the invention is a fluid-filled engine mount according to the above-described first mode, further comprising: a rubber elastic plate partially defining the pressure-receiving chamber and disposed elastically deformable due to a void formed on an opposite side across from the rubber elastic plate in relation to the pressure-receiving chamber; and a working air chamber disposed on an opposite side across from the flexible layer in relation to the equilibrium chamber, and adapted to function as the orifice control member, wherein the negative pressure conduit is connected to the working air chamber so that the negative pressure applied to the working air chamber is exerted on the rubber elastic plate of the pressure-receiving chamber via the equilibrium chamber and the orifice passage, and when the negative pressure applied to the working air chamber has an absolute value greater than the predetermined value, the rubber elastic plate undergoes retracted elastic deformation to exhibit high spring stiffness, and when the negative pressure applied to the working air chamber has an absolute value not greater than the predetermined value, the rubber elastic plate is free from the retracted elastic deformation and permits to be elastically deformable in a non-restricted state.

According to this mode of the invention, the vibration damping performance of the engine mount is automatically changed depending on input vibrations varying in accordance with vehicle driving conditions, since there is effectively utilized negative pressure generated in the air intake side of the engine, whose value fluctuates in accordance with the driving condition of the vehicle. More specifically, as a result of the pressure-receiving chamber being applied with the relatively larger negative pressure transmitted from the equilibrium chamber and the orifice passage, the rubber elastic plate is retracted inward of the pressure-receiving chamber and undergo its large elastic deformation, thereby being maintained in a high spring stiffness state. With this state, avoided is fluid pressure absorption in the pressure-receiving chamber by means of the rubber elastic plate, thereby effectively ensuring a sufficient amount of flow of the fluid through the orifice passage between the pressure-receiving chamber and the equilibrium chamber. Thus, the fluid-filled engine mount of this mode is able to exhibit excellent vibration damping effect on the basis of resonance of the fluid flowing through the orifice passage upon input of the idling vibrations.

On the other hand, when the vehicle is in non-idling, i.e., running condition, engine vibrations become a significant problem especially in an acceleration condition where a throttle valve opening degree increases and generated negative pressure value decreases. As a result, negative attraction causing the rubber elastic plate deformation towards the inside of the pressure-receiving chamber is reduced, thereby decreasing spring stiffness of the rubber elastic plate and permitting freely elastic deformation of the rubber elastic plate. Therefore, pressure fluctuation generated in the pressure-receiving chamber during input of vibrations will be absorbed by means of the elastic deformation of the rubber elastic body. Thus, the fluid-filled engine mount of this mode is able to excellent vibration damping or isolating effect with respect to booming noises during running of the vehicle, for example.

With this arrangement, since the wall spring stiffness of the pressure-receiving chamber is made small by the presence of the rubber elastic plate, the tuning frequency of the orifice passage is shifted to the lower frequency side. Thus, the fluid-filled engine mount of this mode is able to exhibit excellent vibration damping effect with respect to low frequency vibration such as engine shakes, on the basis of resonance of the fluid flowing through the orifice passage, as well.

A fifth mode of the invention is a fluid filled engine mount according to the above-described first mode, wherein the orifice control member includes: an orifice open/close valve member; a biasing member for always applying a biasing force to the orifice open/close valve member in order to elastically hold the valve member in an orifice closing state thereof; and a pneumatic actuator for actuating the orifice open/close valve member on the basis of air pressure action externally applied, and the negative pressure conduit is connected to the pneumatic actuator, and when the negative pressure applied to the pneumatic actuator has an absolute value not greater than the predetermined value, the orifice open/close valve is held in the orifice closing state by means of the biasing force applied thereto by the biasing member, and when the negative pressure applied to the working air chamber has an absolute value larger than the predetermined valve, the pneumatic actuator applies an actuating force to the orifice open/close valve so as to bring the orifice open/close valve to an orifice opening state thereof against the biasing force applied thereto.

According to this mode, negative pressure generated in an air intake port of an internal combustion engine of the vehicle will be directly exerted to the pneumatic actuator to drive the actuator. This arrangement makes it possible to operate the pneumatic actuator in accordance with the driving condition of the vehicle, without needing specific operation control device for the pneumatic actuator, whereby the opening/closing state of the orifice passage can be controlled depending on the input vibrations, making it possible to adequately change the vibration damping characteristics of the engine mount in accordance with change of vibrations to be damped.

A sixth mode of the present invention is a fluid-filled engine mount according to the above-described fifth mode, wherein the pneumatic actuator is disposed on an opposite side across from the flexible layer in relation to the equilibrium chamber, and an output member of the pneumatic actuator is opposed to an opening of the orifice passage to the equilibrium chamber with the flexible layer interposed therebetween, while the output member of the pneumatic actuator is biased toward and forcedly pressed onto the opening of the orifice passage by means of the biasing member to thereby fluid-tightly close the opening of the orifice passage to the equilibrium chamber.

According to this mode, the pneumatic actuator is provided with a simple structure, and the pneumatic actuator makes it possible to relatively readily have the opening of the orifice passage opened and closed with fluid-tight sealing, while utilizing the flexible layer, without needing a specific switch valves or the like.

A seventh mode of the invention is a fluid-filled engine mount according to the above-described fifth or sixth mode, further comprising a fluid passage disposed between the pressure-receiving chamber and the equilibrium chamber and always permitting a fluid communication between the chambers, and is tuned to a frequency range of engine shakes.

In the fluid-filled engine mount constructed according to the mode, when the vehicle is in a non-idling condition where the orifice passage tuned to the idling vibrations becomes the closed state, the fluid will be force to flow through the fluid passage between the pressure-receiving chamber and the equilibrium chamber based on relative pressure fluctuation between the two chambers upon input of vibrations, whereby the engine mount is able to exhibit an excellent damping effect based on the resonance of the fluid flowing through the fluid passage with respect to engine shakes. On the other hand, when the vehicle is in an idling condition and when the engine mount is subjected to idling vibrations of a frequency range higher than the fluid passage tuning frequency, a resistance to flow of the fluid through the fluid passage is considerably increased due to anti-resonance motion of the non-compressible fluid, bringing the fluid passage in a substantive closed state. With this state, an amount of fluid flowing through the orifice passage is sufficiently obtained, so that the fluid-filled engine mount of this mode is capable of exhibiting excellent vibration damping effect with respect to input idling vibrations on the basis of resonance of the fluid flowing through the orifice passage.

BRIEF DESCRIPTION OF THE DRAWINGS

The forgoing and/or other objects features and advantages of the invention will become more apparent from the following description of a preferred embodiment with reference to the accompanying drawings in which like reference numerals designate like elements and wherein.

DETAILED DESCRIPTION OF PREFERRED EMBODIMENTS

Figure 1:
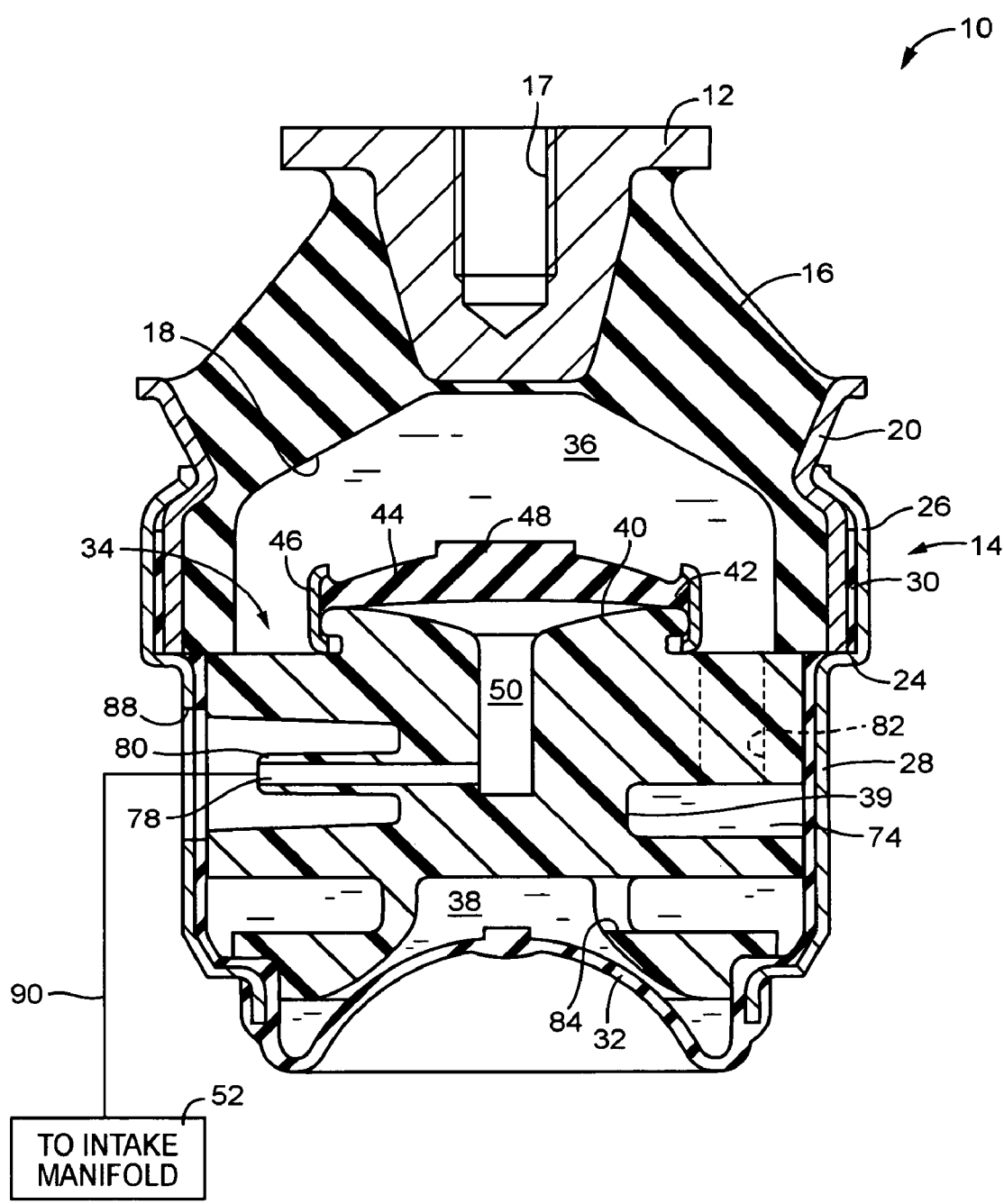
FIG. 1 is an elevational view in axial or vertical cross section of a fluid filled engine mount constructed according to a first embodiment of a fluid-filled engine mount of the present invention.
Figure 2:
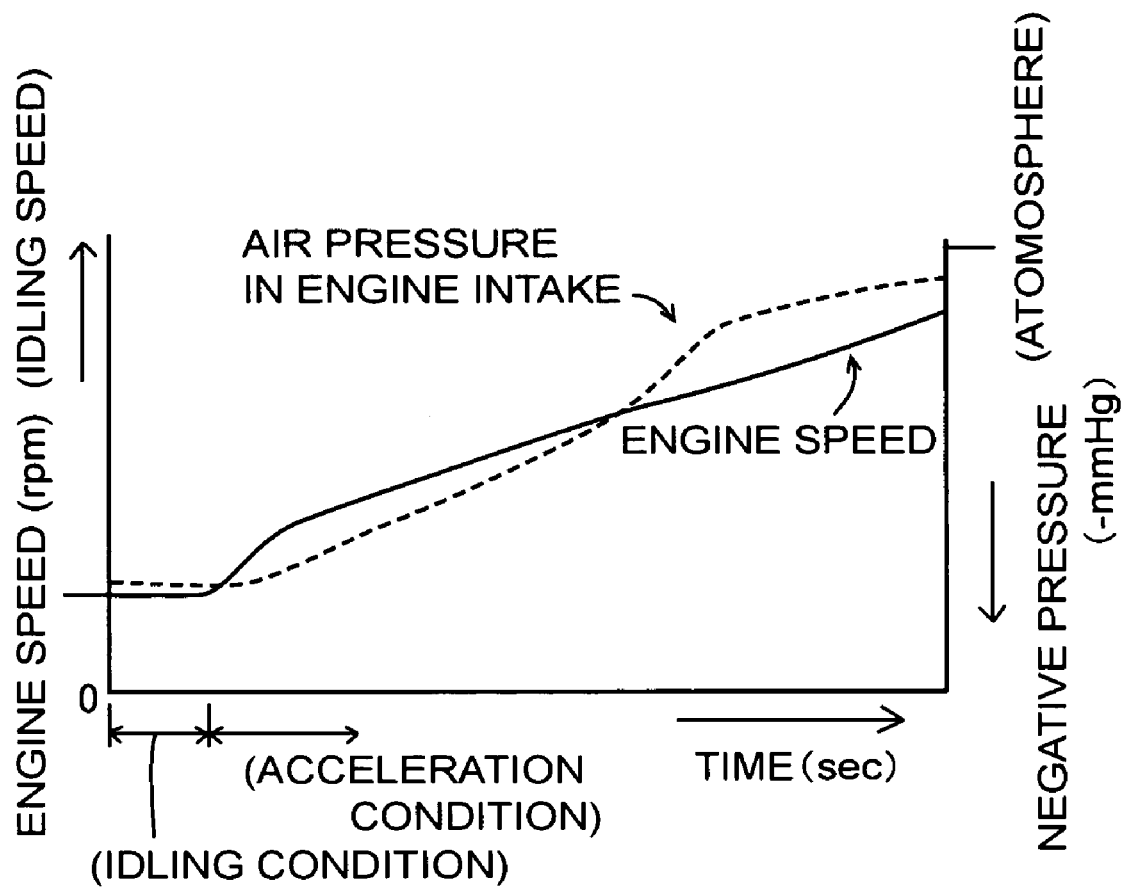
FIG. 2 is a graph demonstrating a measurement of magnitude of negative pressure generated in an air intake manifold side of an internal combustion engine.

Referring first to FIGS. 1 and 2, shown is an engine mount 10 for use in automotive vehicles, which is constructed according to a first preferred embodiment of the present invention. The engine mount 10 includes a first mounting member 12 and a second mounting member 14, which are both made of metal. The first and second mounting members 12, 14 are disposed spaced away form each other, and elastically connected together by means of a rubber elastic body 16 interposed therebetween. As a result of the first mounting member 12 being mounted onto a power unit side of the vehicle, and the second mounting member 14 being mounted onto a body side of the vehicle, the power unit is elastically mounted on and supported by the body in a vibration damping fashion. In the following description, the vertical direction shall be basically equal to the vertical direction as seen in FIG. 1.

Described in detail, the first mounting member 12 is formed in an approximate inverted truncated conical shape. As a result of a bolt (not shown) being screwed into a tapped hole 17 open in the upper face of the first mounting member 12, the first mounting member 12 is mounted onto the power unit side.

Further, the elastic body 16 is bonded to the first mounting member 12 through vulcanization process of a rubber material for forming the elastic body. The elastic body 16 is formed in an approximate conical trapezoid of a large diameter in its entirety and wherewith the diameter expands downward, and also possesses a recess portion 18 having an inverted cone-shaped hollow opening in the large diameter end face thereof. The first mounting member 12 is bonded to the elastic body 16 in a state of being disposed in a concentric relationship, and being inserted axially downward from the end face of the small diameter side of the elastic body 16. Further, a metal sleeve 20 of a large diameter cylindrical shape is superimposed onto and bonded through the vulcanization process to the outer circumferential surface of the large diameter end portion of the elastic body 16.

On the other hand, the second mounting member 14 is of a stepped cylindrical shape with a relatively large diameter, having a shoulder portion 24 formed at its axially intermediate portion. An axially upper side of the shoulder portion 24 is made to be a large diameter portion 26, and an axially lower side of the shoulder portion 24 is made to be a small diameter portion 28, with the shoulder portion 24 axially interposed between the large and small diameter portions 26, 28. Further, the inner circumferential surfaces of the large diameter portion 26 and small diameter portion 28 are respectively provided with, a thin sealing rubber layer 30 covering approximately the entire surface, and bonded thereto through a vulcanization process of a rubber material. The small diameter side or lower opening of the second mounting member 14 is provided with a diaphragm 32 formed from a thin rubber film having a thin discoid shape. As a result of an outer peripheral edge of this diaphragm 32 being bonded by vulcanization to the peripheral edge of the lower opening, the lower opening of the second mounting member 14 is surely fluid-tightly closed. In the present embodiment, the diaphragm 32 is formed integrally with the sealing rubber layer 30, and a flexible layer is formed with this diaphragm 32.

The large diameter end portion 26 of the second mounting member 14 is superimposed onto the metallic sleeve 20, and is fitted and secured thereon by press fitting or drawing processing, whereby the second mounting member 14 is fixed onto the outer circumferential surface of the elastic body 16. Thereby, the first and second mounting members 12, 14 may be positioned approximately on the same central axis, which will become a primary vibration input direction, and these are disposed in mutually spaced away and elastically connected state. Moreover, as a result of the large diameter portion 26 of the second mounting member 14 being fixed to the elastic body 16, the upper opening of the second mounting member 14 is fluid-tightly closed by the elastic body 16.

For instance, a cylindrical bracket (not shown) is also fitted onto the second mounting member 14. With the bracket being fixed to the body of the vehicle (not shown) by means of a bolt or the like, the second mounting member 14 may be securely mounted onto the body.

Moreover, the second mounting member 14 houses a partition member 34 in the small diameter portion 28 thereof such that the partition member 34 is disposed between the opposing faces of the elastic body 16 and the diaphragm 32. This partition member 34 is made of rigid materials such as metal or synthetic resin, and in a block shape of a thick discoid. This partition member 34 is engaged with the small diameter portion 28 of the second mounting member 14, with its outer circumferential surface fluid-tightly and cohesively securely fixed to the inner circumferential surface of the small diameter portion 28 via the sealing rubber layer 30 compressed therebetween. As a result of the partition member 34 being assembled within the second mounting member 14 as described above, the area formed between the elastic body 16 and the diaphragm 32 and hermetically sealed from exterior space is partitioned in a fluid tight manner with the partition member 34. Thus, a pressure-receiving chamber 36 partially defined by the elastic body 16 is formed in the upper part of the partition member 34, and an equilibrium chamber 38 partially defined by the diaphragm 32 is formed at the lower part of the partition member 34. The equilibrium chamber 38 is designed to readily allow the capacity change based on the deformation of the diaphragm 32.

The pressure-receiving chamber 36 and the equilibrium chamber 38 are respectively sealed upon being filled with non-compressible fluid such as water, alkylene glycol, polyalkalyene glycol, silicon oil and the like. In the present embodiment, a low-viscosity fluid having a viscosity of 0.1 Pa·s or less is preferably adopted in order to yield the advantages of the vibration damping effects based on resonance of the fluid which will be described later.

Further, the partition member 34 has a groove 39 open in its outer circumferential surface and extending in a circumferential direction with a given length while winding or curving. The opening of the groove 39 is fluid tightly closed by the second mounting member, thereby providing an orifice passage 74. One of opposite ends of the orifice passage 74 is communicated with the pressure-receiving chamber 36 through a communication hole 82 formed through the partition member 34, while the other end of the orifice passage 74 is communicated with the equilibrium chamber 38 through a communication hole 84 formed through the partition member 34. That is, the orifice passage 74 always permits a fluid communication between the pressure-receiving chamber 36 and the equilibrium chamber 38 so as to allow fluid flow between the pressure-receiving chamber 36 and the equilibrium chamber 38 through the orifice passage 74.

When pressure fluctuation is generated in the pressure-receiving chamber 36 based on the elastic deformation of the elastic body 16 upon input of vibrations, fluid is made to flow between the pressure-receiving chamber 36 and the equilibrium chamber 38 via the first orifice passage 74 based on the relative pressure difference between the pressure-receiving chamber 36 and the equilibrium chamber 38. Particularly, in the present embodiment, the first orifice passage 74 is tuned to a medium frequency range of about 20 Hz, which corresponds to engine idling vibrations. Therefore, passive vibration isolating effects are provided based on the resonance or flow action of the fluid flowing through the orifice passage 74 in relation to the input idling vibrations.

Tuning of the orifice passages 74 may be carried out, for instance, by adjusting the length and cross sectional area of the passage, in consideration of the wall spring rigidity (characteristic value corresponding to the pressure change amount required for changing in the amount of unit capacity) of the pressure-receiving chamber 36 and the equilibrium chamber 38. Generally, the frequency in which the phase of the pressure fluctuation transmitted via the orifice passage 74 changes and causes resonance of the fluid, may be comprehended as the tuning frequency of such orifice passage 74.

The partition member 34 also has a central recess 40 opening in a central portion of the upper end face thereof. Moreover, a circumferential engaging projection 42 protruding upward of the partition member 34 is formed integrally to the opening peripheral edge of the central recess 40. The central recess 40 has an interior face of mortar shape with somewhat inward curve.

An oscillating rubber elastic plate 44 having a discoid shape of a prescribed thickness is superimposed on the opening of the central recess 40, and a metallic cylindrical fixture 46 is bonded through vulcanization process of a rubber material to the outer circumferential surface of the oscillating rubber elastic plate 44. The cylindrical fixture 46 is fitted onto the engaging projection 42 of the partition member 34 at the lower end opening thereof, and is fluid-tightly caulked to the engaging projection 42. As a result, the opening of the central recess 40 is fluid-tightly closed by the oscillating rubber elastic plate 44, whereby an orifice control member in the form of a working air chamber 50 that is independent from the pressure-receiving chamber 36 and the equilibrium chamber 38 is formed. The rubber elastic plate 44 has a generally dome shape having a smooth inner surface somewhat projecting into a pressure-receiving chamber side entirety. On a central portion of an outer surface of the rubber elastic plate 44, integrally formed is a central thick walled portion 48 projecting outward with a diameter substantially equal to a half of that of the opening of the central recess 40.

Furthermore, an air passage 78 is formed in the partition member 34, and one opening end of this air passage 78 communicates with the working air chamber 50, and the other end of the air passage 78 is open in a port 80 protrusively provided onto the outer circumferential surface of the partition member 34. The opening of the air passage 78 to the working air chamber 50 is located at the deepest central bottom face of the central recess 40. While the air passage 78 is open in the outer circumferential surface of the partition member 34 via the port 80, the portion is exposed to the external space through the opening window 88 formed through the small diameter portion 28 of the second mounting member 14.

In a state where the mount is installed, an external air conduit 90 is connected to this port 80, so that air pressure is introduced to the working air chamber 50 from the external space through the air conduit 90.

The air conduit 90 adapted to be connected to the port 80 at one end is always directly connected at the other end to an intake manifold of the internal engine, which functions as an intake port of the engine. With this arrangement, negative pressure generated in the intake manifold 52 of the internal combustion engine is always directly applied to the working air chamber 50.

With the engine mount 10 of construction according to the present embodiment defined as described above, the working air chamber 50 is directly exerted with negative pressure generated in the intake manifold 52 of the internal combustion engine, whose magnitude varies as the driving conditions of the vehicle change. The absolute value of the negative pressure generated in the intake manifold 52 was actually measured, and the result of the measurement is demonstrated in the graph of FIG. 2. As is understood from the graph of FIG. 2, during idling condition of the vehicle (i.e., engine idling condition), negative pressure of sufficiently large value is constantly provided in the intake manifold 52. During running condition of the vehicle (non-idling condition), on the other hand, there is a tendency of decrease in value of the generated negative pressure. Especially, during acceleration condition of the vehicle where a throttle valve opening degree increases and vibrations to be damped is prone to be generated, generated negative pressure has a tendency to have a small value.

The negative pressure variation demonstrated in the graph of FIG. 2 will be introduced into the working air chamber 50 directly, so that the rubber elastic plate 44 undergoes elastic deformation having magnitude depending on the value of the negative pressure applied to the working air chamber 50. In the present embodiment, a predetermined value, i.e., a threshold value of the negative pressure is set to a value somewhat smaller than the negative pressure value generated in the intake manifold during idling condition of the vehicle, in advance.

That is, during idling condition of the vehicle, negative pressure having a value greater than the threshold value is applied to the working air chamber 50, so that the rubber elastic plate 44 is suctioned to be held in contact with the interior face of the working air chamber 50. That is, the elastic deformation of the rubber elastic plate 44 is inhibited, so that pressure fluctuation in the pressure-receiving chamber 36 is never absorbed by mean of the elastic deformation of the rubber elastic plate 44. This efficiently generate pressure fluctuation in the pressure-receiving chamber 36, thereby advantageously assuring a sufficient amount of fluid flow between the pressure-receiving chamber 36 and the equilibrium chamber 38 through the orifice passage 74. Thus, the fluid-filled engine mount 10 of this embodiment is able to exhibit passive damping effect with respect to idling vibrations on the basis of resonance or flow action of the fluid through the orifice passage 74.

During running condition of the vehicle (non-idling condition), on the other hand, vibrations transmitted from the engine will be considerable, especially at the acceleration condition. Since in the acceleration condition, the throttle valve opening degree increases and generated negative pressure value decreases, the value of the negative pressure applied to the working air chamber 50 is accordingly minimized. With this state, the rubber elastic plate 44 will be spaced away from the interior face of the working air chamber 50 and disposed to be elastically deformable. Therefore, pressure fluctuation generated in the pressure-receiving chamber 36 will be absorbed or moderated by means of the elastic deformation of the rubber elastic plate 44, whereby the engine mount 10 is able to provide vibration isolating effect with respect to booming noises generated during running of the vehicle.

With the above state, moreover, the spring stiffness of the wall of the pressure-receiving chamber 36 is made small since the wall of the, chamber 36 is partially defined by the rubber elastic plate 44, whereby a tuning frequency of the orifice passage 74 is shifted to the lower frequency side. With this regards, in the idling condition of the vehicle, the rubber elastic plate 44 is suctioned to be held in close contact with the interior face of the working air chamber 50 as a result of increase of the value of the negative pressure applied to the working air chamber 50, as discussed above, and the rubber elastic plate 44 is restricted over its substantially entire area. With this state, the tuning frequency of the orifice passage 74 is set to a frequency range of idling vibrations, so that the engine mount 10 is able to provide excellent vibration isolating effect with respect to the idling vibrations on the basis of resonance of the fluid flowing through the orifice passage 74.

Figure 3A:
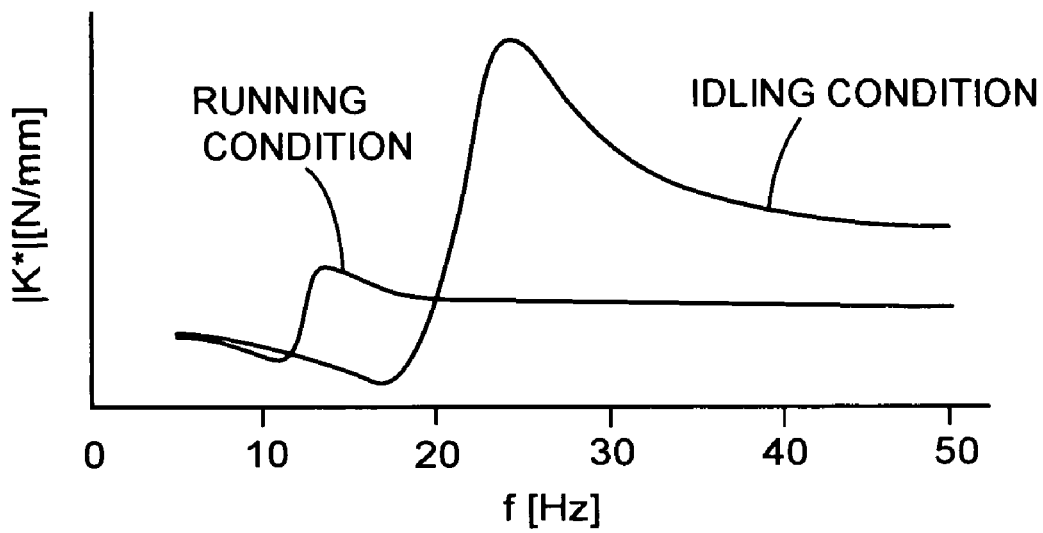
FIGS. 3A and 3B are graphs each demonstrating a measurement of vibration damping characteristics of the engine mount for automotive vehicles constructed according to the first embodiment of the invention.
Figure 3B:
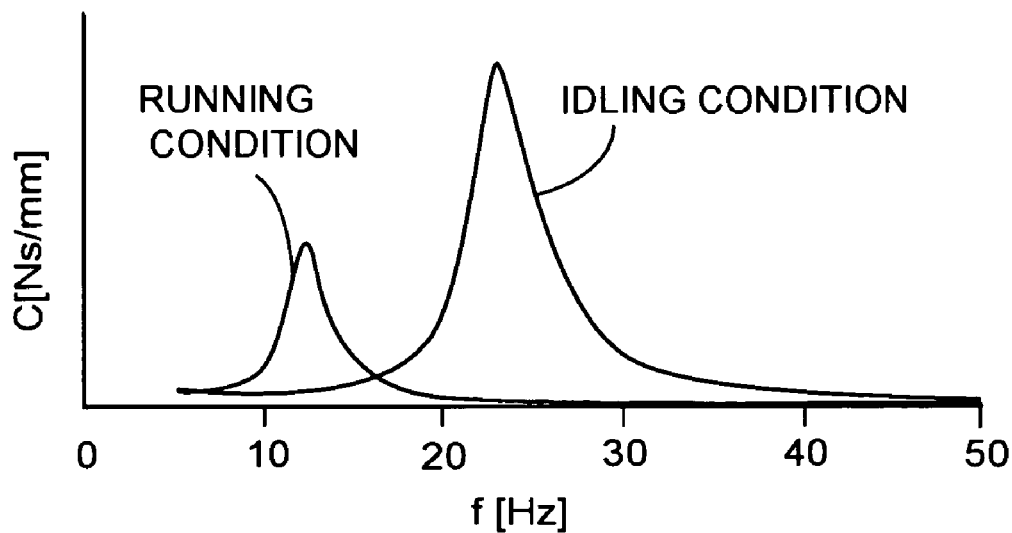

The vibration damping performance of the engine mount 10 constructed according to the present embodiment was actually measured. The obtained actual measurements are demonstrated in the graph of FIGS. 3A and 3B. As is apparent from the graph of FIG. 3A, when the vehicle is operated under the driving condition with the great negative pressure applied to the working air chamber 50, it is noted that the engine mount 10 exhibits vibration isolating effect with respect to idling vibrations of about 20 Hz, with the help of low dynamic spring effect based on resonance of the fluid flowing through the orifice passage 74. As is apparent from FIG. 3B, when the vehicle is operated under the idling condition with the reduced negative pressure applied to the working air chamber 50, it is noted that as a result of the tuning frequency of the orifice passage 74 being shifted to the lower frequency side, the engine mount 10 is able to exhibit high vibration damping effect with respect to the engine shakes of about 10 Hz, based on resonance of the fluid flowing through the orifice passage 74.

As is understood from the aforementioned description, the fluid-filled engine mount 10 of the present embodiment is capable of automatically shifting its damping characteristics depending on the operating conditions of the vehicle. By means of this advantage of the invention, the engine mount 10 is able to provide an excellent vibration damping effects both to idling vibrations generated during idling condition of the vehicle, and to engine shakes generated during running condition of the vehicle.

Moreover, in the running condition of the vehicle, the rubber elastic plate 44 is made elastically deformable. While booming noises or other higher frequency vibrations of 50 Hz or more may be generated in the running condition of the vehicle, precise pressure fluctuation generated in the pressure-receiving chamber 36 will be absorbed or moderated by the elastic deformation of the rubber elastic plate 44. Thus, the engine mount 10 is able to exhibit excellent vibration isolating effect with respect to high-frequency small-amplitude vibrations.

Still further, the rubber elastic plate 44 is formed with the central thick walled portion 48 integrally formed on the central portion thereof such that the a shoulder portion formed at a junction between a basal-side outer peripheral edge of the central thick walled portion 48 and the outer surface of the rubber elastic plate 44 is positioned situated above the intermediate portion of the sloped mortar shape interior face of the working air chamber 50. With this arrangement, after the rubber elastic plate 44 is suctioned to be held in contact with the interior face of the working air chamber 50, by means of the large negative pressure exerted thereon during idling condition of the vehicle, once the vehicle is shifted to its running and acceleration conditions and the negative pressure applied to the working air chamber 50 is made small, the central thick walled portion 48 of the rubber elastic plate 44 is restored to its original state or shape owing to a relatively large elasticity thereof. That is, the presence of the central thick walled portion 48 assures that the rubber elastic plate 44 will be stably restored from a suctioned state being adhered to the interior face of the working air chamber 50 to an original state being spaced away from the interior face, owing to the large elasticity of the central thick walled portion 48. Thus, the fluid-filled engine mount 10 of this embodiment ensures operation of changing its damping characteristics with improved stability.

Figure 4:
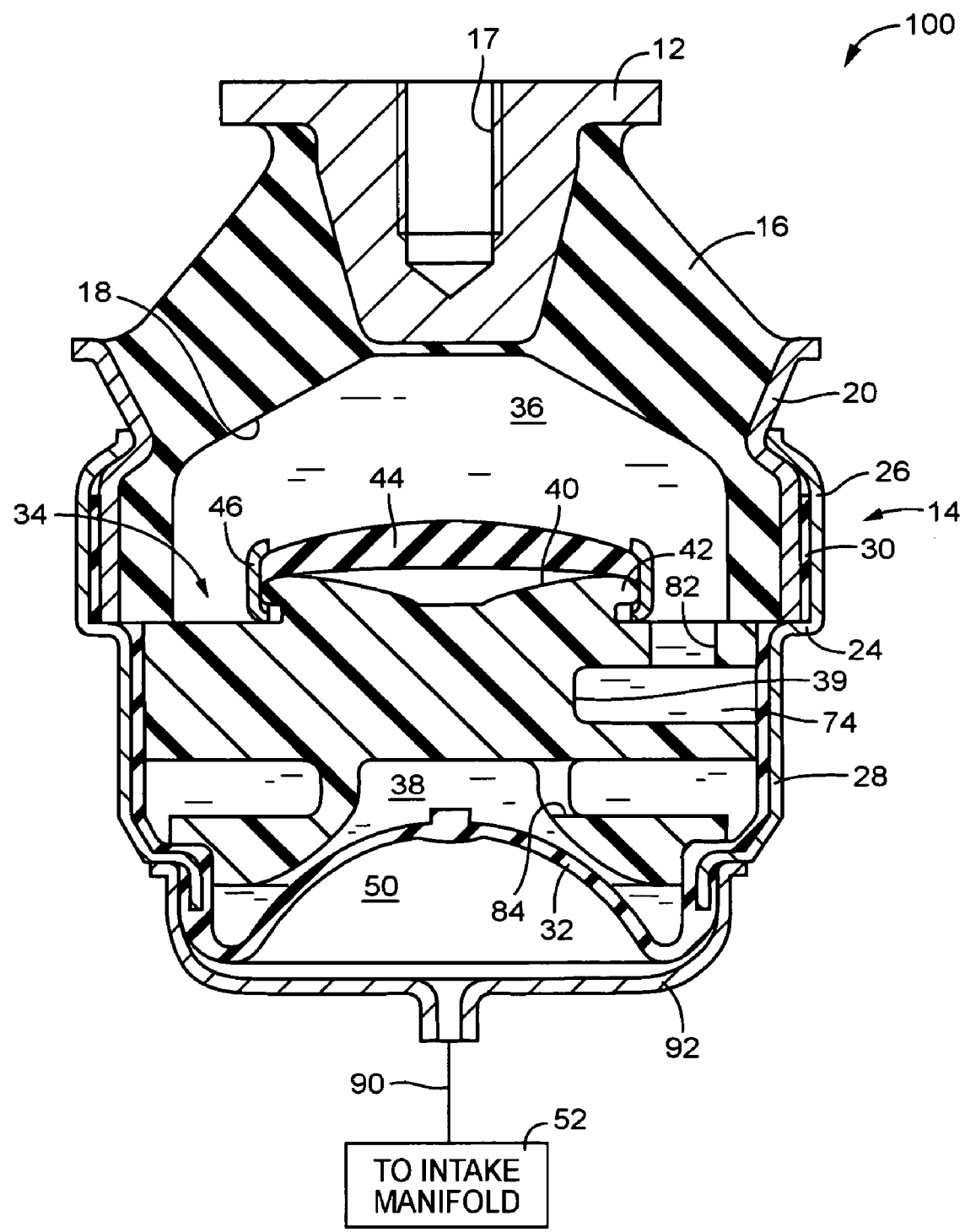
FIG. 4 is an elevational view in axial or vertical cross section of a fluid filled engine mount constructed according to a second embodiment of a fluid-filled engine mount of the present invention.
Figure 5:
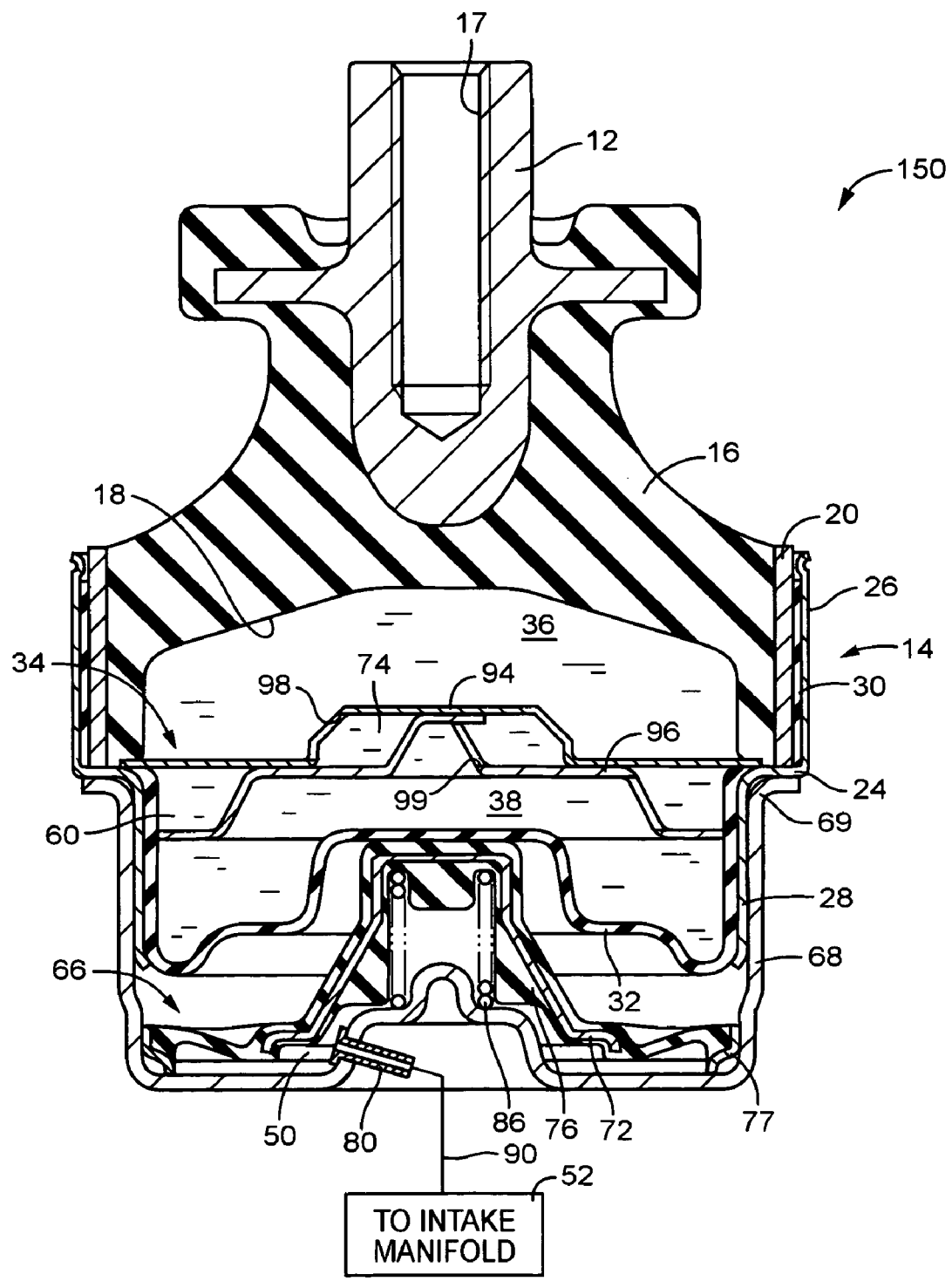
FIG. 5 is an elevational view in axial or vertical cross section of a fluid filled engine mount constructed according to a third embodiment of a fluid-filled engine mount of the present invention.

Referring next to FIGS. 4 and 5, there are shown engine mounts 100 and 150 constructed according to second and third embodiments of the invention, respectively. In these embodiments described hereinbelow, the same reference numerals as used in the preceding embodiment will be used in the instant embodiment to identify structurally and/or functionally corresponding elements, and no detailed description of these elements will be provided.

As shown in FIG. 4, the engine mount 100 constructed according to the second embodiment includes a cover member 92 assembled with the second mounting member 14 in order to cover the lower open end portion of the second mounting member 14. This cover member 92 cooperate with the diaphragm 32 to define therebetween the working air chamber 50 disposed on an opposite side across from the diaphragm 32 in relation to the equilibrium chamber 38. To this working air chamber 50 is connected an air conduit 90 directly connected to the intake manifold of the internal combustion engine.

Like the engine mount 10 of the first embodiment, the engine mount 100 constructed as described above utilizes negative pressure generated in the air intake side of the engine whose value changes depending on the operating condition of the vehicle, whereby the engine mount 100 is capable of automatically changing its damping characteristics in accordance with input vibrations varying depending on the operating conditions of the vehicle.

That is, during idling condition of the vehicle, negative pressure having a value greater than the threshold value is applied to the pressure-receiving chamber 36 via the equilibrium chamber 38 and the orifice passage 74, so that the rubber elastic plate 44 undergoes large elastic deformation so as to be suctioned toward the inside of the pressure-receiving chamber 36, thereby being held in a state of high dynamic spring constant. With this arrangement, pressure fluctuation generated in the pressure-receiving chamber 36 is never absorbed by mean of the elastic deformation of the rubber elastic plate 44. This efficiently generate pressure fluctuation in the pressure-receiving chamber 36, thereby advantageously assuring a sufficient amount of fluid flowing between the pressure-receiving chamber 36 and the equilibrium chamber 38 through the orifice passage 74. Thus, the fluid-filled engine mount 100 of this embodiment is able to exhibit passive damping effect with respect to idling vibrations on the basis of resonance or flow action of the fluid through the orifice passage 74.

During running condition of the vehicle (non-idling condition), on the other hand, vibrations transmitted from the engine will be considerable, especially at the acceleration condition. Since in the acceleration condition, the throttle valve opening degree increases and generated negative pressure value decreases, the value of the negative pressure to suction the rubber elastic plate 44 toward the pressure-receiving chamber side is accordingly minimized. With this state, the rubber elastic plate 44 will be readily elastically deformable. Therefore, pressure fluctuation generated in the pressure-receiving chamber 36 will be absorbed or moderated by means of the elastic deformation of the rubber elastic plate 44, whereby the engine mount 10 is able to provide vibration isolating effect with respect to booming noises generated during running of the vehicle.

With this arrangement, since the wall spring stiffness of the pressure-receiving chamber 36 is made smaller by the presence of the rubber elastic plate 44, the tuning frequency of the orifice passage is shifted to the lower frequency side. Thus, the fluid-filled engine mount 100 of this embodiment is able to exhibit excellent vibration damping effect with respect to low frequency vibration such as engine shakes, on the basis of resonance of the fluid flowing through the orifice passage 74, as well.

Meanwhile, in the engine mount 150 constructed according to the third embodiment of the invention as shown in FIG. 5, the partition member 34 separating the pressure-receiving chamber 36 and the equilibrium chamber 38 is formed of an upper partition plate 94 and an lower partition plate 96, which are made of metal, and are mutually superimposed on and bonded to each other in a direction of the wall thickness thereof.

The upper and lower partition plates 94, 96 cooperate to each other to define therebetween the orifice passage 74 that extends over a length somewhat smaller than the entire way around a circumference of the partition member 34. One of opposite ends of the orifice passage 74 is communicated with the pressure-receiving chamber 36 through a first communication hole 98 formed through the upper partition plate 94, while the other end of the orifice passage 74 is communicated with the equilibrium chamber 38 through a second communication hole 99 formed through the lower partition plate 96. This orifice passage 74 is tuned so as to excite resonance of the fluid flowing therethrough at a middle frequency range of about 20 Hz that corresponds to idling vibrations.

Also, the upper and lower partition plates 94, 96 cooperate to define therebetween a fluid passage 60 that extends over a length somewhat smaller than the entire way around the circumference of the partition member 34. This fluid passage 60 is communicated at one end thereof with the pressure-receiving chamber 36, and at the other end thereof with the equilibrium chamber 38. This fluid passage 60 is tuned so that the engine mount 150 exhibits high damping effect on the basis of resonance of the fluid flowing therethrough, with respect to a low frequency range of about 10 Hz that corresponds to engine shakes.

Further, a pneumatic actuator 66 is assembled with the lower open end portion of the second mounting member 14. The pneumatic actuator 66 includes a housing 68 of inverted cup shape, and an open end peripheral portion 69 of a cylindrical wall of the housing 68 is press fitted onto and assembled with the small diameter portion 28 of the second mounting member 14.

The housing 68 accommodates therein a metallic output member 72 of generally inverted cup shape. This output member 72 has a skirt like lower open end portion, and a generally annular elastic support member 76 is bonded at its inner rim to an outer peripheral edge of the lower open end portion of the output member 72 so as to extend radially outwardly through vulcanization of a rubber material thereof, while being bonded at its outer rim to an annular metallic fixing ring 77. That is, there is provided an integral vulcanization product wherein the fixing ring 77 and the output member 72 are elastically connected together via the elastic support member 76.

As a result of the fixing ring 77 being press fitted into a bottom portion of the housing 68, the output member 72 as well as the elastic support member 76 cooperate with the housing 68 to define therebetween the working air chamber 50 hermetically sealed from exterior space. Within the working air chamber 50, a biasing member in the form of a coil spring 86 is disposed straddling the gap between an upper wall of the output member 72 and a bottom wall central portion of the housing 68. This coil spring 86 is compressed to be installed in position so that the output member 72 is always pushed or biased upward, i.e., in a direction away from the bottom wall of the housing 68.

Since the output member 72 is disposed axially or vertically opposite to a central portion of the lower face of the partition member 34 in which the second communication hole 99 is situated in order to open the orifice passage 74 to the equilibrium chamber 38, by means of the biasing force of the coil spring 86, the output member 72 is pushed onto and held in tighten contact with the central portion of the lower face of the partition member 34, with the diaphragm 32 interposed therebetween. With this arrangement, the diaphragm 32 functions as an orifice open/close valve member is held in its orifice closing state so that the opening of the orifice passage 74 to the equilibrium chamber 38 is held in a closed state. In this operation state, the diaphragm 32 is held in contact with the partition member 34 only at its central portion, and still allows its free deformation at its outer circumferential portion, thereby allowing a change in volume of the equilibrium chamber 38.

The working air chamber 50 is connected with the air conduit 90 via the port 80 protrusively provided onto the bottom wall of the housing 68, so that air pressure will be externally introduced into the working air chamber 50 via the air conduit 90. Like the engine mount 10 of the first embodiment, the engine mount 150 constructed as described above utilizes negative pressure generated in the air intake side of the engine whose value changes depending on the operating condition of the vehicle, whereby the engine mount 150 is capable of automatically changing its damping characteristics in accordance with input vibrations varying depending on the operating conditions of the vehicle.

That is, during idling condition of the vehicle, negative pressure having a value greater than the threshold value is applied to the working air chamber 50, so that the output member 74 is suctioned toward the bottom wall of the housing 68 against the biasing force of the coil spring 86. As a result, the diaphragm 32 is moved to its orifice opening state or position away from the partition member 34, whereby the opening of the orifice passage 74 is held in fluid communication with the equilibrium chamber 86. With this state, the engine mount 150 is able to exhibit excellent vibration damping or isolating effect on the basis of resonance of the fluid flowing through the orifice passage 74, with respect to idling vibrations.

Figure 6A:
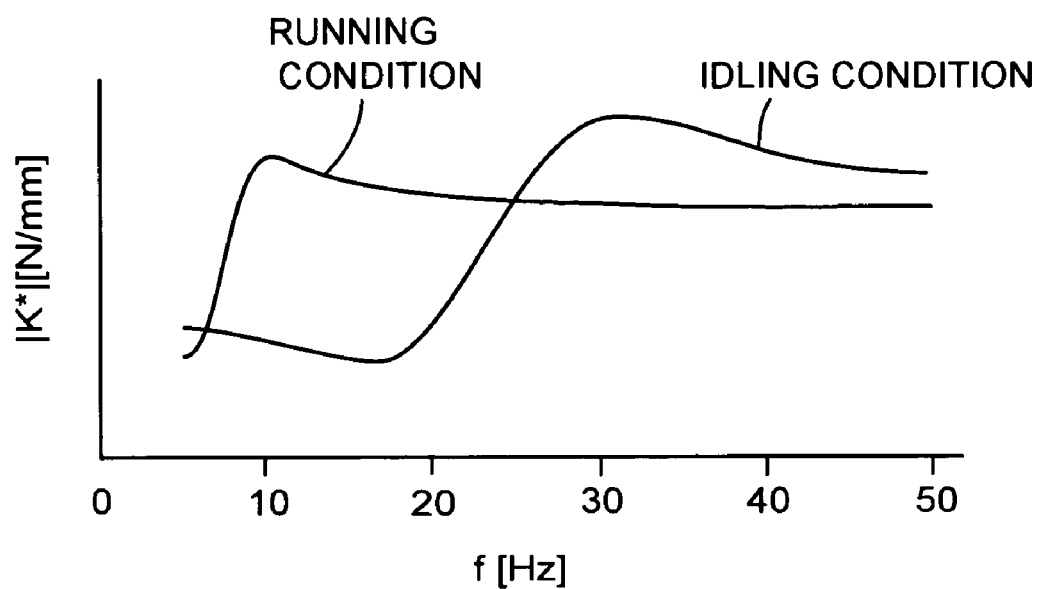
FIGS. 6A and 6B are graphs each demonstrating a measurement of vibration damping characteristics of the engine mount for automotive vehicles constructed according to the third embodiment of the invention.
Figure 6B:
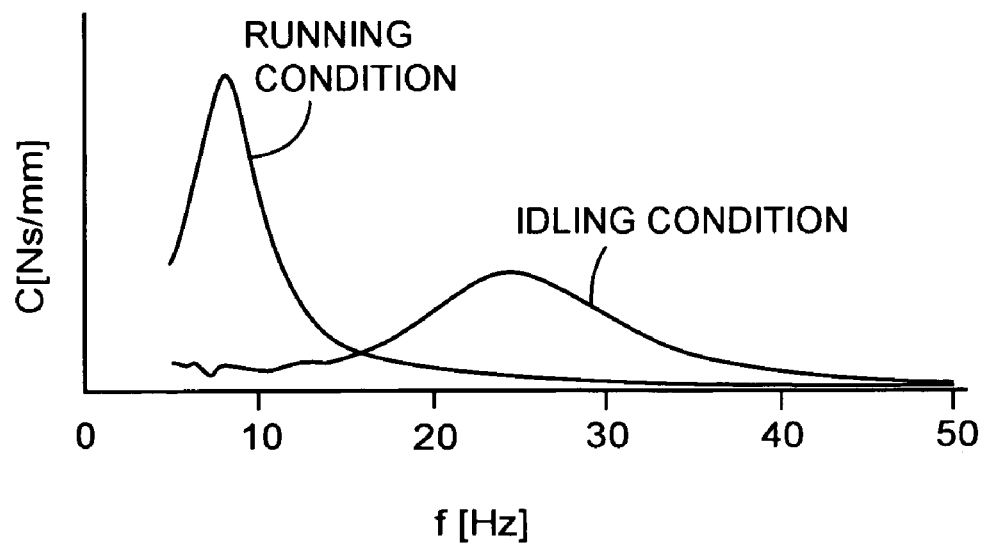

Vibration damping performance of the engine mount 150 constructed as described above was actually measured, and the obtained measurements are demonstrated on graphs of FIGS. 6A and 6B. As is apparent from the graph of FIG. 6A, when the vehicle is operated under the idling condition with the great negative pressure applied to the working air chamber 50, it is noted that the engine mount 150 exhibits vibration isolating effect with respect to idling vibrations of about 20 Hz, with the help of low dynamic spring effect based on resonance of the fluid flowing through the orifice passage 74. As is apparent from FIG. 6B, when the vehicle is operated under the driving condition with the reduced negative pressure applied to the working air chamber 50, it is noted that the engine mount 10 is able to exhibit high vibration damping effect with respect to the engine shakes of about 10 Hz, based on resonance of the fluid flowing through the fluid passage 60.

While the invention has been shown and described in detail hereinabove with reference to certain preferred embodiments, for illustrative purpose only, it is to be understood that the invention is not limited to the details of the illustrated embodiments.

For instance, the number, shape, size of the connecting portion of the air conduit 90 with respect to the working air chamber 50 is not particularly limited to those in the illustrated embodiments, but may be preferably determined while taking into consideration required damping characteristics and the shape or size of the engine installation portion, and the like.

In the illustrated embodiment, the working air chamber 50 is directly connected to the air intake manifold 52 of the internal combustion engine, through the air conduit 90 so that the negative pressure generated in the intake manifold 52 is directly applied to the working air chamber 50. Optionally, an accumulator may be provided on the air conduit 90 in order to eliminate tiny air pressure fluctuation.

In order to prevent infiltration of oil component existing in the air flowing through the air intake manifold 52 into the working air chamber, it is possible to incorporate a filter in the air conduit 90. An oil mist separator is preferably employed as the filter, and a drain device of automatic type or differential pressure type is preferably employed together.

While not enumerated herein, it should be understood that the present invention may otherwise be embodied with various other changes, modifications and improvements, which may occur to those skilled in the art, without departing from the spirit and scope of the invention.

What is claimed is:

1. A fluid filled engine mount for an automotive vehicle, comprising:
    a first mounting member;
    a second mounting member disposed spaced away from the first mounting, member;
    an elastic body for elastically connecting the first mounting member and the second mounting member;
    a pressure-receiving chamber filled with non-compressible fluid and partially defined by the elastic body so as to excite fluid pressure fluctuation upon input of vibration;
    an equilibrium chamber filled with the non-compressible fluid and partially defined by a flexible layer so as to permit change in volume;
    an orifice passage for connecting the equilibrium chamber to the pressure-receiving chamber, and tuned to a frequency band of engine idling vibrations;
    an orifice control member operable by means of negative pressure exerted from an external space so as to restrict flow of the fluid through the orifice passage when an absolute value of the exerted negative pressure is greater than a predetermined value;
    a negative pressure conduit of direct connection type, adapted to always introduce negative pressure available from an air intake port of an internal combustion engine to the orifice control member;
    a rubber elastic plate partially defining the pressure-receiving chamber; and
    a working air chamber formed on an opposite side across from the rubber elastic plate in relation to the pressure-receiving chamber, and adapted to function as the orifice control member,
    wherein the negative pressure conduit is directly connected to the working air chamber so that the rubber elastic plate is suctioned to be held in contact with an interior face of the working air chamber to restrict a motion thereof when the vehicle is in an engine idling condition thereof, and is moved awa from the interior face of the working air chamber so as to be elastically deformable due to an elastic resiliency thereof, when the vehicle is in a non-idling condition.

2. A fluid-filled engine mount according to claim 1, wherein the interior face of the working air chamber is defined by a recess having a motor shape having a somewhat inward curve, and an opening of the recess is fluid-tightly close by the rubber elastic plate so as to provide the working air chamber, and the negative pressure conduit is open to an approximately central portion of a bottom face of the recess, while the rubber elastic plate has a generally dome shape having a smooth inner surface somewhat projecting into a pressure-receiving chamber side entirety, and having an outer surface with a central thick walled portion projecting outward in a central portion thereof.

3. A fluid-filled engine mount according to claim 1, wherein said rubber elastice plate disposed elastically deformable due to a void formed on an opposite side across from the rubber elastic plate in relation to the pressure-receiving chamber;
on an opposite side across from the flexible layer in relation to the equilibrium chamber, and,
wherein the negative pressure conduit is directly connected to the working air chamber so that the negative pressure applied to the working air chamber is exerted on the rubber elastic plate of the pressure-receiving chamber via the equilibrium chamber and the orifice passage, and when the negative pressure applied to the working air chamber has an absolute value greater than the predetermined value, the rubber elastic plate undergoes retracted elastic deformation to exhibit high spring stiffness, and when the negative pressure applied to the working air chamber has an absolute value not greater than the predetermined value, the rubber elastic plate is free from the retracted elastic deformation and permits to be elastically deformable in a non-restricted state.

4. A fluid-filled engine mount according to claim 1, wherein the orifice control member includes: an orifice open/close valve member; a biasing member for always applying a biasing force to the orifice open/close valve member in order to elastically hold the valve member in an orifice closing state thereof; and a pneumatic actuator for actuating the orifice open/close valve member on the basis of air pressure action externally applied, and the negative pressure conduit is connected to the pneumatic actuator, and when the negative pressure applied to the pneumatic actuator has an absolute value not greater than the predetermined value, the orifice open/close valve is held in the orifice closing state by means of the biasing force applied thereto by the biasing member, and when the negative pressure applied to the working air chamber has an absolute value larger than the predetermined valve, the pneumatic actuator applies an actuating force to the orifice open/close valve so as to bring the orifice open/close valve to an orifice opening state thereof against the biasing force applied thereto.

5. A fluid-filled engine mount according to claim 4, wherein the pneumatic actuator is disposed on an opposite side across from the flexible layer in relation to the equilibrium chamber, and an output member of the pneumatic actuator is opposed to an opening of the orifice passage to the equilibrium chamber with the flexible layer interposed therebetween, while the output member of the pneumatic actuator is biased toward and forcedly pressed onto the opening of the orifice passage by means of the biasing member to thereby fluid-tightly close the opening of the orifice passage to the equilibrium chamber.

6. A fluid-filled engine mount according to claim 4, further comprising a fluid passage disposed between the pressure-receiving chamber and the equilibrium chamber and always permitting a fluid communication between the chambers, and is tuned to a frequency range of engine shakes.

7. A fluid-filled engine mount according to claim 1, wherein the negative pressure conduit continuously applies negative pressure available from the air intake port to the orifice control member, without using a switch valve connected thereto.

8. A fluid-filled engine mount according to claim 1, wherein the negative pressure conduit is directly connected at a first end to the orifice control member, and at a second end to a side of the air intake port for directly and continuously introducing negative pressure available from the air intake port to the orifice control member.

* * * * *